United States Patent

[11] 3,630,300

[72] Inventor Warren D. Weinstein
    Huntington Station, L.I., N.Y.
[21] Appl. No. 810,286
[22] Filed Mar. 25, 1969
[45] Patented Dec. 28, 1971
[73] Assignee Henry Troemner Inc.
    Philadelphia, Pa.

[54] ADJUSTABLE TRUSS FOR TORSION BALANCES
    15 Claims, 16 Drawing Figs.
[52] U.S. Cl............................................. 177/196,
    177/DIG. 9
[51] Int. Cl............................................. G01g 1/24
[50] Field of Search...................................... 177/194,
    196, 203, 212, DIG. 9; 24/69

[56] References Cited
    UNITED STATES PATENTS
    935,846  10/1909  Hitt ........................... 177/196
    1,121,861 12/1914 Munzner ....................... 177/196
    1,169,929  2/1916 Conway ........................ 177/196
    1,599,529  9/1926 Hoffer ......................... 177/196 UX
    1,652,631 12/1927 Munzner ....................... 177/196
    3,075,597  1/1963 Richardson .................... 177/196 X
    3,508,624  4/1970 Horan ......................... 177/196 X
    FOREIGN PATENTS
    5,134    4/1886  Great Britain ................. 177/196

Primary Examiner—Robert S. Ward, Jr.
Assistant Examiner—George H. Miller, Jr.
Attorney—Howson and Howson ABSTRACT: A torsion balance has a pair of load pans carried by trusses disposed between opposite ends of a pair of vertically spaced balancing beams which pivot on a central support truss. Each truss has a torsion band with an upper active run stretched between fixed upper corner spools and a lower active run stretched between movable lower corner spools. The lower corner spools engage cams which are rotated to vary the distance between the upper and lower active runs of the band to adjust the sensitivity of the balance to eccentric loads on its pans.

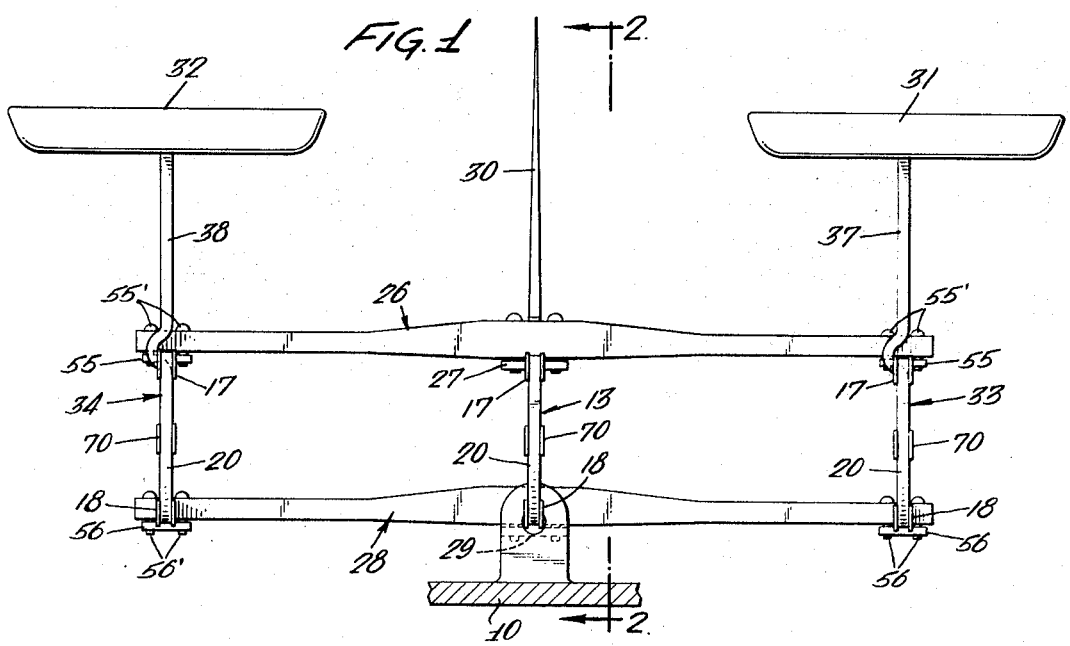
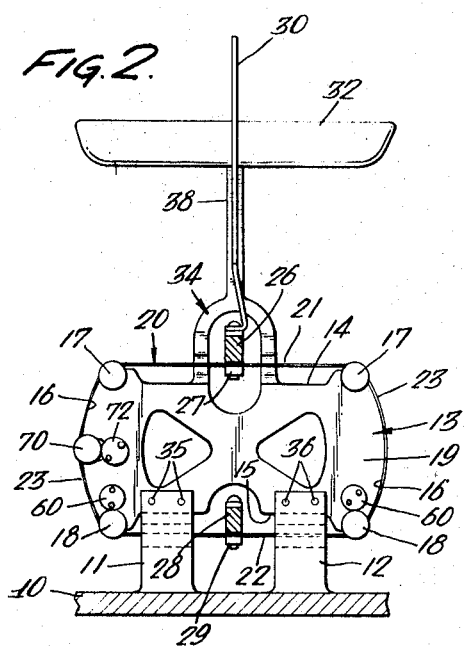
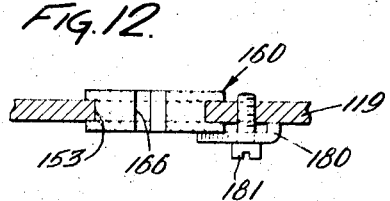
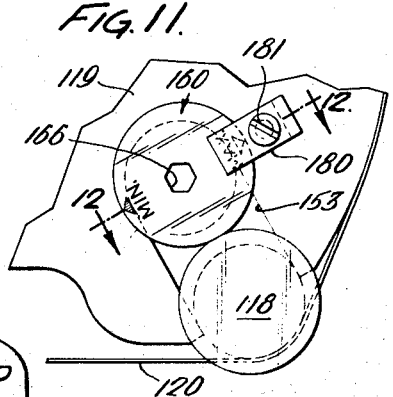
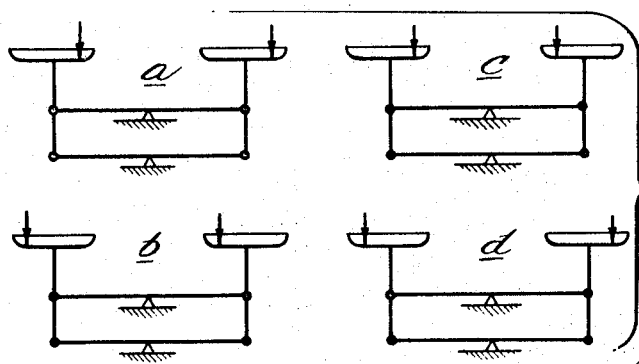

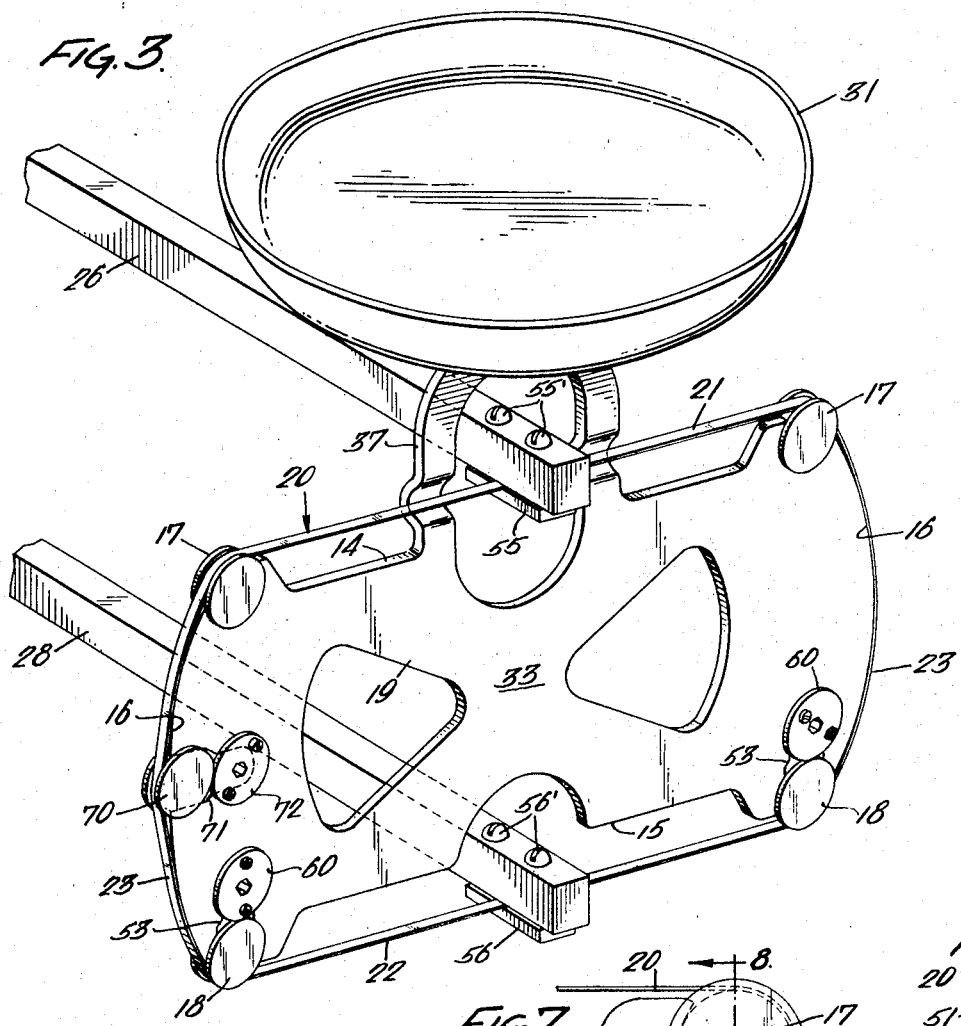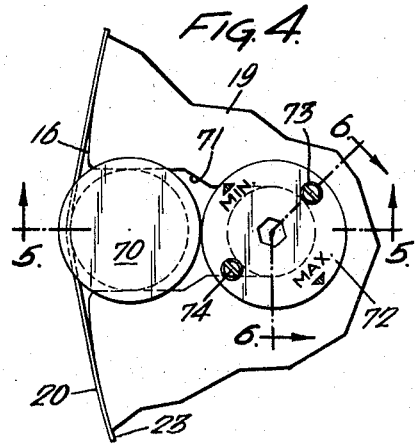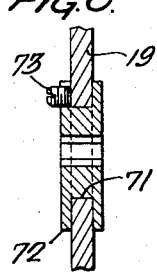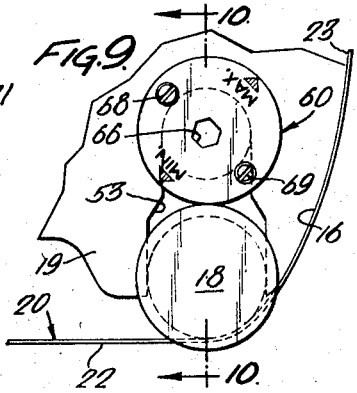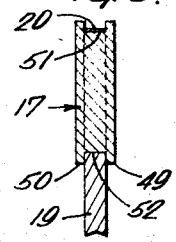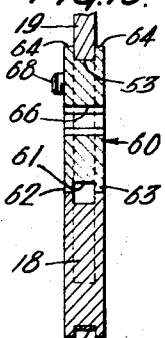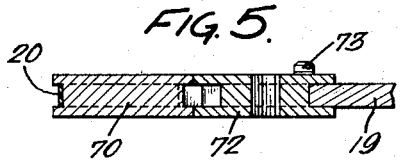

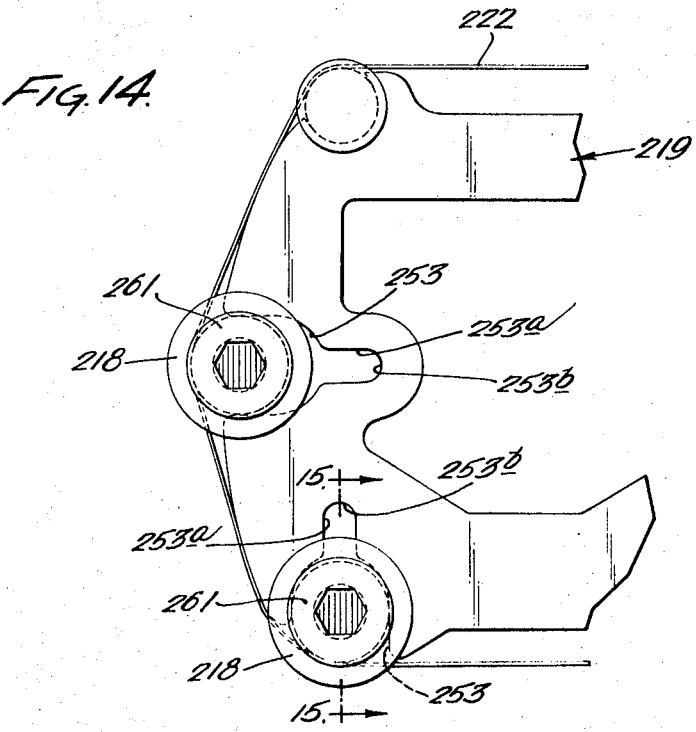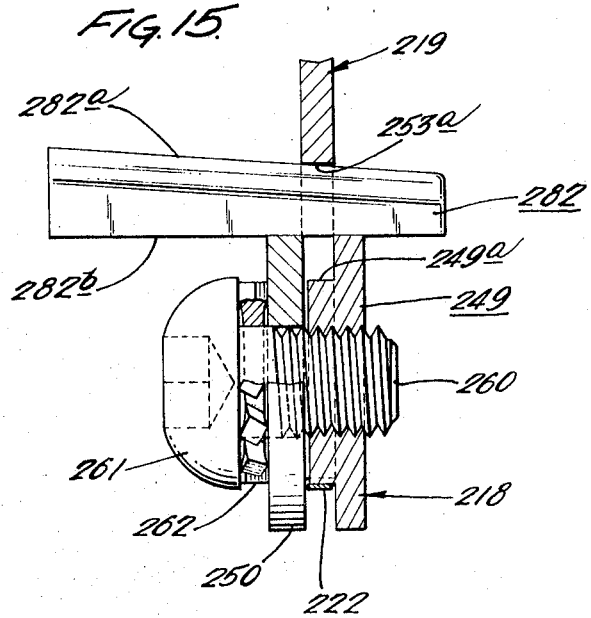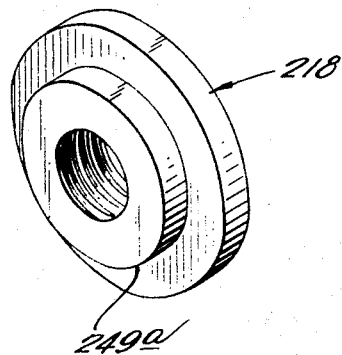

ADJUSTABLE TRUSS FOR TORSION BALANCES

The present invention relates to balances, and more particularly, the present invention relates to new and useful improvements in adjusting the load sensitivity of torsion balances.

In conventional prescription balances, an elongated beam is disposed to pivot on a fulcrum located at its midpoint. Pans or trays are mounted at the opposite ends of the beam, the pans being adapted to receive samples of unknown weights to be compared with known weights in a customary manner. In order to reduce anomalies due to friction, a torsion balance utilizes a pair of beams disposed in a common vertical plane and a central wired truss to serve as a fulcrum between the respective beams and their central support, and end-wired trusses mount the pans at the opposite ends of the beams.

In balances of this type, the central truss is fixed and the end trusses which support the pans are free for vertical movement upon pivotal movement of the beams. The beams are connected to the tensioned wires of the trusses so that when the beams pivot away from dead center the wires are elastically deformed by twisting, permitting extremely predictable movement of the end trusses in a plane parallel to the fixed central truss.

Heretofore, the wired trusses have been constructed by stringing a wire in the form of a band or ribbon around the periphery of a plate and expanding the plate by peening or deforming it until the desired tension is effected in the wire. This tensioning procedure is undesirable for a number of reasons. First, a skilled artisan is required to properly peen or deform the truss plate, since improper peening may adversely affect critical dimensions of the plate such as the points of support for the wire which are essential to the accuracy of the balance. In addition to being time consuming, this procedure does not permit the balance to be adjusted when the trusses are assembled with the balancing means. Furthermore, the truss plate must be sufficiently malleable to permit the peening which renders it readily susceptible to damage, distortion and instability. Thus, at present, torsion balances are not readily adapted for field adjustment, and their proper adjustment is dependent upon the skill of an operator.

In addition to having a minimum amount of performance anomalies due to friction in the balance mechanism, a prescription balance must not be sensitive to the location of loads placed on its pans. For example, the balance must be accurate even if the loads on the pans are inside toward the fulcrums of the beams, outside away from the fulcrums of the beams or at unequal distances from the fulcrums. In the past, it has been customary to make the scale insensitive to the location of these loads by bending the beams and/or peening the truss plates in a trial-and-error method until the proper insensitivity is achieved. In addition to being dependent upon the skill of an operator, this procedure is slow, and unless caution is exercised, this procedure may damage the balance mechanism.

With the foregoing in mind, it is a primary object of the present invention to provide a torsion balance having improved trusses which may be readily adjusted to render the balance insensitive to the location of applied loads.

It is another object of the present invention to provide a balance having novel trusses which mount torsion bands capable of being properly tensioned and adjusted independently of the skill of an operator.

As a further object, the present invention provides unique means by which the band tension of torsion-balance trusses may be adjusted without disturbing critical dimensions of the trusses.

As still another object, the present invention provides a torsion balance which is economical to manufacture, having a maximum number of interchangeable parts.

More particularly, in the present invention a balance is provided with a central truss for supporting a pair of vertically spaced balancing beams at their midpoints, and the balance is provided with a pair of trusses for supporting load pans at the opposite ends of the beams. A torsion band is stretched around guide spools mounted at the corners of each truss with each torsion band having parallel upper and lower active runs which are fixed to the beams. The spools at the lower corners of each truss are mounted in slots, and the spools are displaced in their slots by means of cams which engage the spools and which displace the spools when operatively adjusted. Thus, by adjusting the cams, the distance between the active runs of the torsion bands may be varied to regulate the sensitivity of the balance to eccentric loads on the pans. In addition, a spool and a cooperating cam is mounted on each truss to engage an inactive run of the torsion band, so that when this spool is displaced by its cam, the tension in the torsion band is adjusted.

In addition to these objects, other objects, features and advantages of the present invention will become apparent from the following description when taken in conjunction with the accompanying drawings in which:

FIG. 1 is a front elevational view of a torsion balance embodying the present invention;

FIG. 2 is a sectional view taken along line 2—2 of FIG. 1 to illustrate a truss which supports the horizontally disposed balancing means;

FIG. 3 is an enlarged fragmentary perspective view of the right-hand truss and pan of FIG. 1;

FIG. 4 is an enlarged fragmentary view of means for adjusting the tension in the torsion band;

FIGS. 5 and 6 are sectional views taken along the lines 5—5 and 6—6 of FIG. 4;

FIG. 7 is an enlarged fragmentary view of an upper corner spool for mounting the torsion band;

FIG. 8 is a sectional view taken along line 8—8 of FIG. 7;

FIG. 9 is an enlarged fragmentary view of a lower corner spool for adjusting the distance between the upper and lower active runs of the torsion band;

FIG. 10 is a sectional view taken along line 10—10 of FIG. 9;

FIG. 11 is an enlarged fragmentary view of a modified embodiment of the present invention;

FIG. 12 is a sectional view taken along line 12—12 of FIG. 11;

FIG. 13a–d are schematic diagrams of various load tests for measuring the sensitivity of a balance to eccentric loads on the pans;

FIG. 14 is a fragmentary view of another modified embodiment of the present invention;

FIG. 15 is a sectional view taken along line 15—15 of FIG. 14 and including separable, spool-displacing cam means; and FIG. 16 is a perspective view of a portion of a modified form of spool.

Referring now to the drawings, and more particularly to FIG. 1, there is illustrated a balance of the type used for weighing medicinal prescriptions. The balance has a base 10 with a pair of upstanding columns 11 and 12 (See FIG. 2) located centrally of the balance for fixedly mounting a center truss 13 which comprises a truss-plate 19 and a wire 20. The plate 19 is rectangular and extends vertically upward having upper and lower longitudinal edges 14 and 15 respectively, and side edges 16. The wire 20 is stretched around a series of flanged spools including upper spools 17 and lower spools 18 mounted at the corners of the truss 13. In the present instance, the wire 20 is an endless band or ribbon, and the band 20 is constrained in the plane of the truss by the flanges of the corner spools. The band has an upper active run 21 which is spaced from the upper edge 14 of the truss, in the present case by the upper corner spools 17,17. The band 20 also has a lower active run 22 which is spaced from the lower edge 15 of the truss by the lower corner spools 18,18. In addition, the band 20 has inactive runs 23,23 intermediate the upper and lower runs 21 and 22 which bear against and extend along the side edges 16 of the truss 13.

The active runs of the torsion band 20 provide horizontal fulcrums or axes on which a pair of symmetrical beams are mounted in a common vertical plane. To this end, an upper beam 26 (FIGS. 1 and 2) is secured to the upper active run 21 by means of a clamp 27, and a lower beam 28 is secured to the lower active portion 22 by means of a clamp 29. A pair of load pans or trays are mounted at opposite ends of the balancing beams, a pan 31 being mounted at the right-hand ends of the beams and a pan 32 being mounted at the left-hand ends of the beams. The pans 31 and 32 are each carried by respective trusses 33 and 34 which are disposed in vertical planes between and normal to the upper and lower beams 26 and 28. Similarly to the center truss, each of the pan-carrying trusses has a torsion band mounting a truss plate to provide parallel upper and lower active runs which are clamped to adjacent ends of the upper and lower beams respectively to provide horizontal constraint axes supporting the pans on the beams. Thus, when loads are applied to the load pans, the beams are permitted to pivot on their fulcrums in response to the difference in the magnitude of the loads, and the end trusses are maintained parallel as they are displaced. In addition, a pointer 30 projects upwardly from the upper beam 26 to provide an indication of the angular displacement of the beams.

As noted heretofore, prescription balances are required to meet certain standards of accuracy. Included within these standards is the requirement that the balance must not be sensitive to the location of loads placed on its pans. Accordingly, load-shift tests have been established by which the sensitivity of a balance to the location of its pan-loads may be determined. These shift tests are commonly known as the right and left end-load tests and the inside and outside load tests. The locations of the loads on the pans during these tests are illustrated schematically in FIG. 13, the right end-load and the left end-load tests being illustrated in FIGS. 13a and 13b, and the inside and outside load tests being illustrated in FIGS. 13c and 13d respectively.

Although a torsion balance may be sensitive to the position of the loads placed on its pans, it has been found that this sensitivity can be obviated by properly adjusting the trusses in the torsion balance. It has been determined that the sensitivity of the torsion balance to the right and left end-load tests may be corrected by varying the parallel distance between the upper and lower active runs on the center or support truss. Moreover, the sensitivity of the balance to the inside and outside load tests can be adjusted by similarly varying the distance between the upper and lower active runs on the pan-carrying trusses. Heretofore, sensitivity adjustments have been effected by deforming the upper and lower balancing beams and deforming the truss-plates in a trial and error method until the desired sensitivity adjustments have been found. The present invention obviates this undesirable method by providing means on the trusses to vary the parallel distance between the active runs of the band to effect the proper adjustment of the balance.

To this end, the location of the upper active runs of the torsion bands are fixed on the trusses, and the location of the lower active runs of the torsion bands are varied with respect to the upper runs until the desired parallel distance is achieved between the active runs of the bands. The center and end trusses 13, 33 and 34 are identical except for the outline of the truss-plate, where the plate 19 of the center truss 13 is supported on the columns 11 and 12 as indicated at 35 and 36 in FIG. 2, the plates 19 of the end trusses 33 and 34 have extensions 37 and 38 respectively supporting the pans 31 and 32 as shown in FIG. 1. Accordingly, the same reference numerals have been applied to the various corresponding parts of the trusses. To afford the adjustments, the torsion band 20 is mounted in the plane of the plate 19 by the upper and lower flanged guide spools 17 and 18 mounted at the corners of the plate. The guide spools are identical, and each guide spool 17 for example, has a pair of spaced flanges 49 and 50 (FIG. 8) with a reduced cylindrical body portion 51 intermediate the flanges. The guide spools mounted in shaped recesses in the corners of the plate; for example, the body of each of the upper corner spools 17 is received within a semicylindrical recess 52 (FIGS. 7 and 8) and the body of each of the lower corner spools is received within an elongated recess or slot 53, as shown in FIGS. 9 and 10, the flanges engaging the faces of the plate to prevent axial displacement of the spools. The spools are maintained within their respective recesses by the torsion band 20, the flanges of the spools cooperating to maintain the torsion band in proper alignment with the margins of the plate 19.

The trusses are connected to the balancing beams, for example by a pair of clamps 55 and 56 which clamp the active runs of the torsion bands to the ends of the beams. The clamps 55 and 56 are tightened against the middle of the respective active runs by means of screws 55',55' and 56',56' and to couple the adjacent ends of the balancing beams, so that when loads are applied to the load pans, the balancing beams are constrained to pivot together on their horizontal fulcrums and maintain the plate 19 vertical.

In accordance with the present invention, the upper pair of corner spools are fixed in the truss-plate and the lower pair of corner spools are movable with respect to the upper pair to adjust the spacing between the active runs of the torsion bands. To this end, the slots 53,53 which mount the lower corner spools 18,18 extend vertically upward from the lower edge of each truss-plate. Means is provided to displace the lower spools vertically in their slots, and in the present instance, the displacing means comprises a cam or eccentric member 60 engaging the spool 18 for example. The cam 60 has a cylindrical body 61 (FIG. 10) and a pair of parallel end plates or rims 62 and 63 each having an eccentric cam surface 64 disposed normal to the plane of the rims. The cam 60 is rotatable in the slot 53, and its eccentric surface 64 engages the periphery of the flanges on its cooperating spool 18. In this manner, angular displacement of the cam 60 is a clockwise direction (See FIG. 9) urges the spool 18 downwardly against the torsion band to displace the rearward end of the lower run of the band away from the plate. In a like manner, the angular displacement of a similar cam mounted at the opposite lower corner of the plate urges its cooperating spool downwardly against the forward end of the lower run of the band. Thus, by properly rotating the cams, the distance between the upper and lower active runs of the torsion band may be varied to adjust the sensitivity of the balance.

In order to facilitate the adjustment of the balance, means is provided to operate the cams. In the present instance, polygonal wrench flats in sockets 66 (FIGS. 9 and 10) extend through the centers of the cams 60 for receiving a suitable wrench (not shown). The cams are releasably locked in their adjusted positions by means of diametrically opposed set screws 68 and 69 threaded into one of the cams 60 for example. In this manner, the balance may be periodically adjusted simply by turning the setscrews to lock and unlock the cams and then rotating the cams with a suitable wrench.

In accordance with another important object of the present invention, means is provided to adjust the tension in the band on each truss. To this end, the adjusting means comprises a guide spool 70 mounted on the forward side of the truss-plate 19 (See FIGS. 3 and 4 for example) and means for displacing the guide spool 70. In the present instance, the guide spool 70 is similar to the corner spools and engages the inactive run 23 of the torsion band along the forward edge of the truss-plate 19 (FIG. 3). The guide spool 70 slides horizontally in a slot 71 in the plate, and a cam 72, similar to the corner cams engages the guide spool 70. Similarly to the corner cams, the tension adjusting cam 72 is releasably locked in selected positions by setscrews 73 and 74, and the cam 72 has a wrench socket for receiving a suitable wrench. Therefore, when the cam 72 is rotated in a clockwise direction on its axis the guide spool 70 is displaced horizontally forward against the inactive run 23 to increase the tension in the torsion band (see FIG. 4). Conversely, when the cam 72 is rotated in an opposite counterclockwise direction, the guide spool is displaced horizontally rearward to reduce the tension in the torsion band. Thus, the torsion band on each truss may be properly tensioned simply by rotating the cam on its side.

In a modified embodiment of the present invention, a fine adjustment may be provided for spacing the active band-runs on the trusses and increasing or decreasing the tension in the torsion band without requiring modified cams or spools. To this end, a truss-plate 119 (FIGS. 11,12) has a slot 153 which extends diagonally inward from the lower corners of the plate, for example, the lower rearward corner as illustrated in FIG. 10. A corner spool 118 slides within the slot 153 and engages a torsion band 120 between its flanges. The spool 118 is displaced in its slot by a cam 160 which engages the flanges of the spool, the cam 160 being locked in selected positions by a clamp 180 secured to the plate 119 by a screw 181. In addition, wrench flats for turning the cam are provided in a socket 166 through the center of the cam 160. In this manner, a fine spacing and tension adjustment is provided for trusses, since the vertical displacement of the spool 118 and the tension increase in the band is a function of the diagonal angle of the slot 153. Thus, the cam 160 must be rotated through a greater arc to effect a predetermined vertical spool displacement than would be required to effect the same vertical spool displacement in the preferred embodiment.

If desired, an additional embodiment of the present invention may be provided having modified cam means for displacing the spools in their respective slots. To this end, a truss-plate 219 (FIG. 14) is provided with a slot 253, for example, which mounts a spool 218 for displacement therein. In the present instance, the slot 253 has a narrow portion 253a which terminates in an abutment surface 253b (See FIG. 15). In this embodiment, the spool 218 is displaced in the slot 253 by cam means which includes a wedge 282 having tapered camming surfaces on opposite edges 282a and 282b. As may be seen in FIG. 15, the camming surface 282a engages the abutment surface 253b and the camming surface 282b engages the periphery of the spool 218. The spool 218 may be displaced in its slot for adjusting the band by advancing the wedge 282 rightward or leftward as required.

In this embodiment, the spool 218 has a novel configuration by which it may be locked in place after the desired adjustment is effected. To this end, the spool 218 comprises a threaded cylindrical member 249 having an outwardly protruding boss 249a and a bored cylindrical member 250, the members being disposed on opposite outer sides of the plate 219 adjacent to the slot 253 and cooperating to form the spool 218. As may be seen in FIG. 15, the boss 249a is disposed across the slot 253 and engages a tension band 222 between the members 249 and 250, the width of the boss 249a being narrower than the width of the plate 219. In the present instance, the members 249 and 250 are interconnected by a bolt 260 threadedly carried by the member 249 and having its head 261 engaging the member 250 through a resilient washer 262. Thus, with this arrangement, the spool 218 may be locked in position after the desired band adjustment is effected by rotating the bolt 260 to tighten the members 249 and 250 against the sides of the plate 219. If desired, the wedge 282 may then be removed from the slot 253a.

In accordance with the present invention, the trusses are assembled and preliminary adjustments are made to the torsion bands before the trusses are mounted in the balance. The preliminary adjustments are made by adjusting the positions of the lower corner spools to space the upper and lower active runs of the bands. The proper tension is then applied to the torsion bands by adjusting the guide spools on the side of each truss. After the trusses are assembled in the balance, the balance is subjected to the right and left end-load tests and the inside and outside load tests. If the tests indicate that the balance is sensitive to end-loads, the sensitivity of the balance is adjusted by varying the distance between the upper and lower active runs of the torsion band on the center support truss. If the tests indicate that the balance is sensitive to inside or outside loads, the sensitivity of the balance is adjusted by varying the distance between the upper and lower active runs of the band on the pan-carrying trusses. These adjustments are effected by properly manipulating the cams on the respective trusses in a manner which should now be readily apparent to one skilled in the art.

Therefore, in view of the foregoing, it may be seen that means has now been provided by which balances may be adjusted so that they are not sensitive to the location of loads placed on their pans. Moreover, the present invention permits the balances to be adjusted with a minimum amount of tools and with a minimum amount of skill on the part of an operator making the adjustments.

While preferred embodiments of the present invention have been described in detail, various modifications, alterations or changes may be made without departing from the spirit and scope of the invention.

What is claimed is:

1. In a torsion balance having vertically spaced-apart upper and lower elongated beams supported to pivot on medial horizontal axes, a pair of plates disposed in upright planes between and transverse to the beams on opposite sides of the beam axes, and at least one torsion band carried by each plate and having substantially parallel upper and lower active runs connected to adjacent ends of the beams to couple the beams together, the improvement comprising adjustable means carried by each plate to engage said band at spaced locations for disposing at least one of said active runs therebetween, said adjustable means being mounted for displacement with respect to said plate for varying the distance between the active runs of said band to adjust the sensitivity of the scale to loads applied eccentric to the plane of each plate.

2. A balance according to claim 1 wherein said band has at least one inactive run extending along an edge of said plate, said plate has a spool engaging said inactive portion and mounted for displacement relative to said edge to selectively increase and decrease the tension in said band, and including cam means for engaging said spool to displace said spool upon displacement of said cam, whereby the tension in said band may be adjusted to vary the operating characteristics of the balance.

3. A balance according to claim 1 including an upright central support plate, a torsion band mounted on said central plate and having parallel upper and lower active runs respectively defining said horizontal axes supporting said beams, and adjustable means carried by said central plate and engaging said axes-defining torsion band for varying the distance between the upper and lower active runs of said band on said central truss, so that the sensitivity of the balance to loads applied eccentric to the planes of said pair of plates may be adjusted.

4. In a torsion balance having vertically spaced-apart upper and lower elongated beams supported to pivot on medial horizontal axes, a pair of plates disposed in upright planes between and transverse to the beams on opposite sides of the beam axes, and at least one torsion band carried by each plate and having substantially parallel upper and lower active runs connected to adjacent ends of the beams to couple the beams together, the improvement comprising: a pair of horizontally spaced-apart guide spools mounted for vertical displacement on each plate and engaging said band to dispose one of said active runs therebetween, and means for displacing said spools relative to said plate, whereby the distance between the upper and lower active band-runs may be adjusted.

5. A balance according to claim 4 wherein said spools have flanges, each plate has a pair of slots slidably receiving said spools between their respective flanges, and said spool-displacing means comprises cam means displaceable on each plate and having camming surfaces for engaging respective spools, so that upon displacement of each cam its cooperating spool is displaced in its slot.

6. A balance according to claim 5 including means for releasably locking said spools in selected positions, whereby the distance between the active band-runs may be periodically adjusted to compensate for changes in the adjustment of the balance.

7. A balance according to claim 5 wherein said spool flanges are formed by a pair of cylindrical members disposed on opposite outer sides of said plate adjacent said slot, one of said members having a boss projecting into said slot for engaging said band, and means interconnecting said members through said slot.

8. A balance according to claim 7 wherein said interconnecting means includes a bolt threadedly carried by said one member, and engaging the other of said members.

9. A balance according to claim 5 wherein each plate has an abutment surface extending transversely to each slot therein and said cam means is engageable between the abutment surface and the periphery of its respective spool.

10. A balance according to claim 9 wherein said cam means includes a wedge having opposite tapered edges defining said cam surfaces and engageable between said abutment surface and said spool periphery when said wedge is disposed transversely to the plane of the plate and in said slot.

11. A balance according to claim 9 wherein said cam means includes a rotary cam having flanges disposed on opposite outer sides of the plate and a shaft connecting said flanges and disposed in said slot with the shaft surface in engagement with said abutment surface, at least one of said flanges having a surface engaging the periphery of its respective spool, one of said shaft and flange surfaces being eccentric so that the spool is displaced in its slot upon rotation of the cam.

12. An adjustable truss for a torsion balance comprising a plate mounting a torsion band around its periphery in a plane of the plate, said torsion band having substantially parallel active runs spaced from respective edges of the plate and at least one inactive run connecting said active runs, a pair of flanged guide spools spaced apart along one of said edges and engaging said band to dispose one of said active runs therebetween, a pair of slots provided in said plate for receiving said guide spools between their flanges to permit translation of the spools in the plane of said plate, and cam means for engaging the flanges of said spools to displace the spools in their respective slots for varying the parallel distance between the active runs of the torsion band.

13. An adjustable truss according to claim 12 wherein said cam means includes a pair of rotary cams each having a pair of eccentric camming surfaces disposed on opposite sides of said plate in engagement with respective flanges of said spools and means to rotate each cam, so that upon rotation of each cam its respective spool is displaced in its slot.

14. An adjustable truss according to claim 12 wherein said cam means includes an abutment surface disposed transversely to said slot and a wedge having a tapered camming surface for engaging between said abutment surface and the flanges of said spools when said wedge is disposed in said slot and transverse to the plane of the plate, so that upon displacement of the wedge its respective spool is displaced in its slot.

15. An adjustable truss according to claim 12 including means mounted on said plate and engaging said torsion band at said inactive run for displacing said band in the plane of said plate to effect adjustment of the tension in said band.

* * * * *